United States Patent [19]
Hoshino et al.

[11] Patent Number: 4,558,568
[45] Date of Patent: Dec. 17, 1985

[54] METHOD AND APPARATUS FOR MOBILIZING GEOTHERMAL FLUID

[75] Inventors: Yuji Hoshino, Yachiyo City; Hajime Endou, Tama City; Kazuyoshi Suda, Funabashi City, all of Japan

[73] Assignee: Mitsui Engineering & Shipbuilding Co., Ltd., Tokyo, Japan

[21] Appl. No.: 673,372

[22] Filed: Nov. 20, 1984

Related U.S. Application Data

[62] Division of Ser. No. 415,701, Sep. 7, 1982, abandoned.

[51] Int. Cl.⁴ .............................................. F03G 7/04
[52] U.S. Cl. .................................. 60/641.5; 60/641.2; 165/45
[58] Field of Search .................. 60/641.2, 641.3, 641.5, 60/646, 657; 165/45

[56] References Cited

U.S. PATENT DOCUMENTS

| | | | |
|---|---|---|---|
| 4,043,129 | 8/1977 | McCabe et al. | 60/641.2 |
| 4,189,923 | 2/1980 | Berg | 60/641.5 |
| 4,211,613 | 7/1980 | Meckler | 165/45 X |

*Primary Examiner*—Stephen F. Husar
*Attorney, Agent, or Firm*—Blakely, Sokoloff, Taylor & Zafman

[57] ABSTRACT

Geothermal fluid is pumped up through a production well applying the following process. The produced geothermal fluid is separated into steam and brine in a separator tank or a flash tank. A part of the separated steam is compressed by a steam compressor and brought into the production well. The steam acts as a pump by its bubble effect and pumps up the brine. The other part of steam and brine are utilized for driving the power generating apparatus such as a turbine, total flow turbine or the like.

4 Claims, 8 Drawing Figures

METHOD AND APPARATUS FOR MOBILIZING GEOTHERMAL FLUID

This is a division of application Ser. No. 415,701 filed Sept. 7, 1982, now abandoned.

BACKGROUND OF THE INVENTION

This invention relates to a method and apparatus for production of geothermal fluid from the liquid dominated geothermal reservoir and a method and apparatus for generating electric power by utilizing the geothermal fluid.

Geothermal energy is becoming important as a substitute for fossil fuel. According to a present method of producing geothermal fluid, the produced hot fluid is separated into steam and hot water for utilizing the steam for electric power generation.

With this method, however, as the geothermal fluid rises through the production well and approach the ground surface, a portion of the hot water evaporates due to pressure drop and the fluid temperature is lowered by evaporation.

The drop of temperature and pressure of the fluid in the well causes not only decrease of available energy of the geothermal fluid but clogging of the well due to precipitation of solute from the fluid and thereby shortening the life of the well casing.

Various methods have been proposed to prevent evaporation of the hot water as well as the temperature drop thereof. For a exmple, an electrically driven water pump is installed in a well to pump up the fluid. However, installation of a water pump in a deep well is difficult or impossible under a certain condition.

Moreover, according to the prior art turbine electric power generating plant utilizing geothermal fluid, the produced hot water is flashed to generate steam which is supplied to a steam turbine coupled to a generator together with steam generated from the production well. Consequently, the temperature of the steam supplied to the steam turbine is lower than that in the reservoir, thus failing to efficiently use the geothermal energy.

To obviate this difficulty it has been proposed to directly supply produced geothermal fluid to a total flow turbine without flashing hot water to drive the turbine with a mixture of steam and hot water. However, temperature drop of the geothermal fluid in the production well is inevitable.

SUMMARY OF THE INVENTION

Accordingly, it is an object of this invention to provide an improved method and apparatus for increasing the quantity of the geothermal fluid produced in a production well and suppressing evaporation of hot water in the production well, thus utilizing geothermal energy at a high efficiency.

Another object of this invention is to provide a novel method of geothermal electric power generation capable of efficiently utilizing geothermal energy.

According to one aspect of this invention there is provided a method of producing geothermal fluid comprising the steps of producing geothermal fluid from the reservoir through a production well, separating steam from the produced geothermal fluid, compressing the separated steam to a pressure higher than that of the geothermal fluid, and blowing the compressed steam into the production well so as to increase the pressure of the geothermal fluid in the production well and/or to increase the quantity of the geothermal fluid produced thereby.

According to another aspect of this invention, there is provided a method of electric power generation utilizing geothermal fluid comprising the steps of producing geothermal fluid through a production well extending into a reservoir containing the geothermal fluid, pressurizing the geothermal fluid in the production well, and supplying the produced geothermal fluid to a total flow turbine for driving an electric generator.

According to still another aspect of this invention, there is provided apparatus for producing geothermal fluid comprising a production well extended into a reservoir containing the geothermal fluid, a water-steam separator connected to an exit port of the production well, a compressor for compressing steam separated by the water-steam separator, and means for supplying the compressed steam into the production well.

DESCRIPTION OF THE PREFERRED EMBODIMENTS

Figures 1, 2:
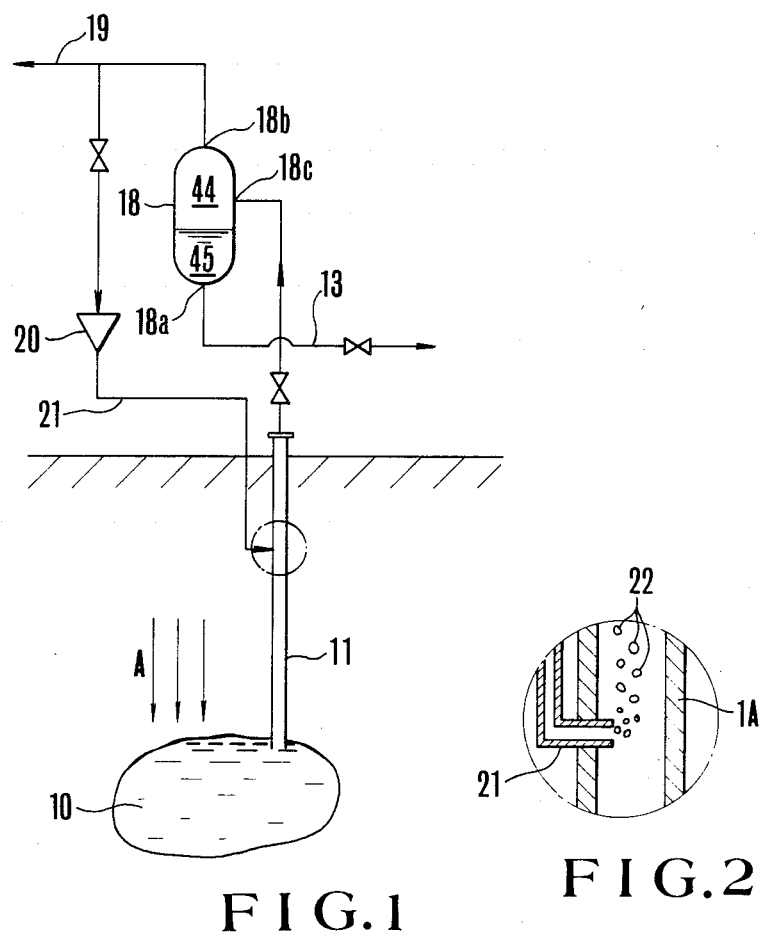
FIG. 1 is a diagrammatic representation showing the principle of the apparatus for generating geothermal fluid according to this invention.
FIG. 2 is a partially enlarged, cross-sectional view of the production well shown in FIG. 1.

With reference to FIG. 1 showing the principle of the apparatus for production of geothermal fluid according to this invention, a geothermal fluid reservoir 10 is located more than several hundred meters to several thousand meters underground and the geothermal fluid therein is highly pressurized from around, by the pressure from the direction of A for example.

According to the apparatus of this invention, therefore, a production well 11 is led down to the reservoir 10 from the surface of the ground by a known method, the production well 11 comprising a pipe the upper end of which being connected with a water-steam separator 18, and the geothermal fluid brought to the separator 18 from the reservoir 10 through the production well 11 is divided into water and steam by a known method. The water is then released to the outside from a separated water outlet 18a of the separator 18 through a pipe 13 to be returned to a suitable water vein by a returning well 2.

As for the steam separated by the separator 18, it is supplied to such a known steam-utilizing apparatus as a turbine-equipped power generator, not shown in the drawing, from a separated steam outlet port 18b through a pipe 19.

A portion of the separated steam outlet port 18b is provided with a feedback route to the production well characterized by this invention. To be specific, the feedback route comprises a compressor 20 connected to the port 18b and a pipe 21 connected to the output side of the compressor 20, the terminal end of the pipe 21 being connected to a suitable position in the ground of the production well 11.

According to the construction described above, via the above-mentioned feedback route characterized by this invention, a portion of the steam separated by the water-steam separator 18 is compressed to subsequently be blown into the production well 11. As a result, steam bubbles 22 are formed in the production well 11 as shown in FIG. 2 to rise toward the surface of the ground through the production well 11. The apparent decrease of specific gravity of the fluid accelerates rising fluid. This enables to increase the quantity of the rising fluid beyond the quantity of the steam blown into the region and/or pressurize the fluid with the pressurized steam bubble 55, that is, a bubble pump action. Thus the geothermal fluid is pumped up at a high temperature. Accordingly, decrease in the temperature of the pressurized geothermal fluid is prevented to efficiently utilize the geothermal energy. The construction is much simpler and not so complicated but its performance is more efficient and reliable than a case where a electrically driven deep well pump is installed at the bottom of the production well. Moreover, according to this invention, as the quantity of the pressurized geothermal fluid is increased it is possible to decrease the number of the production wells, and hence the installation cost. In a geothermal electric power generation with a total flow steam turbine or a binary system, the thermal efficiency can be greatly increased because geothermal fluid at high temperature can be produced.

Figures 3, 4:
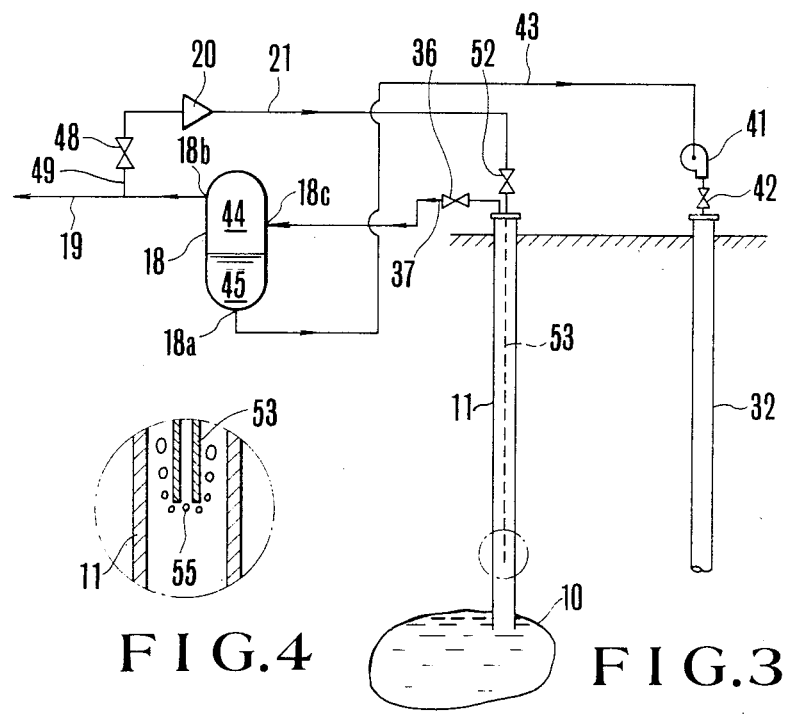
FIG. 3 is a diagrammatic representation showing a preferred embodiment of the apparatus for generating geothermal fluid according to this invention.
FIG. 4 is a partially enlarged, cross-sectional view of the production well shown in FIG. 3.

The apparatus disclosed in FIG. 3 shows a modification of FIG. 1 which includes another construction of steam feed back and returning wells 32, in addition to FIG. 1. As shown in FIG. 3, pipes 37 including valves 36 are connected to the upper end of production well 11. The other ends of the pipes 37 are commonly connected to an inlet port 18c of a water-steam separator tank 18. A pipe 43 including a pump 41 and a valve 42 is connected between the hot water discharge port 18a at the bottom of the water-steam separator 18 and the returning well 32. The geothermal fluid which erupts from the production wells 11 is separated into steam 44 and brine 45 in the water-steam separator tank 18. The brine 45 thus separated is returned back to the substratum through pipe 43, pump 41 and the returning well 32.

The steam outlet port 18b of the water-steam separator tank 18 is connected to a steam utilization apparatus, for example a steam turbine, not shown, via a pipe 19. A steam feed pipe 49 including a valve 48 is branched from the steam pipe 19. The valve 48 is connected to the compressor 20, and the pipe 21 connected to the output side of the compressor 20 is led to the upper end of the steam feed back pipe 53 which is installed in the production well 11 via a valve 52. The valve 48 adjusts the quantity of the steam supplied from the pipe 19 to the compressor 20, and the valve 52 is opened. Then a pipe 53 connected to the output side of the valve 52 is extended to a suitable position in the production well 11 for the terminal end of the pipe 53 to be open in the well 11.

The geothermal fluid is generated as follows. The valve 36 of the production wells 11 are opened to cause the geothermal fluid to erupt under its own pressure. The erupted geothermal fluid is separated into brine 45 and the steam 44 in the water-steam separator 18. A major portion of the separated steam 14 is sent through the pipe 19 to the steam turbine (not shown) for driving an electric generator, while the separated hot water 45 is returned to the substratum through pipe 43 and pump 41 extending through the returning well 32. Since the steam feed back route is branched from the pipe 19 leading to the steam turbine, when the valves 48 and 52 are opened, a portion of the steam 44 is compressed by the compressor 20 and supplied to the pipe 53 in the production wells 11 under pressure. This pressurized steam is supplied to the well 11 through the lower end of the pipe 53 under a pressure higher than the pressure at that region. The present invention requires addition of only a steam compressor and a steam supply pipe to an existing production well.

Utilizing the characteristic of the present invention which provides higher temperature fluid, two embodiments of this invention can be considered for example. One is Rankine cycle electric power generation and another is total flow turbine power generation.

Figure 5:
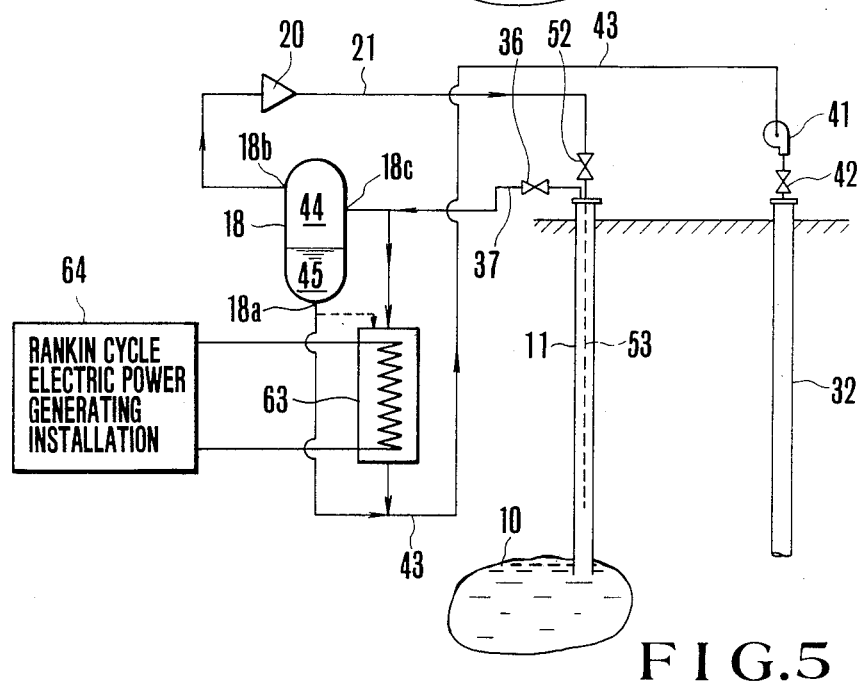
FIG. 5 is a diagrammatic representation showing a modified embodiment of the apparatus for generating geothermal fluid according to this invention.

In FIG. 5 an application of the present invention to Rankine cycle electric power generation apparatus is shown. A heat exchanger 63 is connected to the upper end of the production well 11 through the pipe 37 and the valve 36 and to the returning well 32 through the pipe 43, the pipe 41 and the valve 42. The electric power generation is performed by higher temperature and higher pressure hot water supplied from the production well 11. A quantity of steam required to pump up the geothermal fluid is supplied from the separator 18, wherein the fluid branched from the pipe 37 to the separator inlet port 18c is separated into steam.

Figure 6:
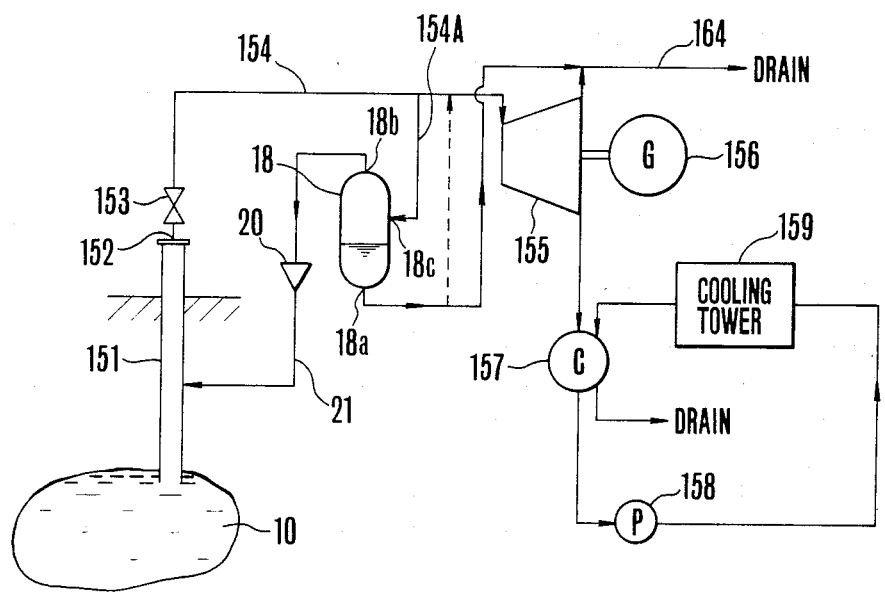
FIG. 6 is a diagrammatic representation of a geothermal electric power generating plant utilizing this invention.

Another embodiment of the invention will now be described with reference to FIG. 6. As shown, a production well 151 is extended to the reservoir where geothermal fluid is contained.

The upper opening 152 is connected to a total flow turbine 155 via a valve 153 and a pipe 154 for driving an electric generator 156. A pipe 154A branches off from the pipe 154 to be connected to an inlet port 18c of the water-steam separator 18. The steam separated by the separator 18 is supplied to the compressor 20 from the steam outlet 18b to be further induced to the suitable position of the production well 151 through the pipe 21 as pressurized steam. The hot water separated by the separator 18 is supplied, on the other hand, to a pipe 164 on the output side, that is, the drain side, of the turbine 155 through the water outlet 18a. To add, the hot water can be forwarded to the turbine 155 by returning it first to the pipe 154 as shown by a dotted line. Thus, geothermal fluid of a higher temperature can be produced from the production well 11 to be sent to the turbine 155. Consequently, the total flow turbine 155 is driven by hotter water or a mixture of hot water and steam. The discharge end of the turbine 155 is connected to a condenser 157 to condense discharged steam. The condensated steam is sent to a cooling tower 159 by a pump 158 and the cooled water is supplied to the condenser 157 to condensate the steam and then discharged as a drain.

Figure 7:
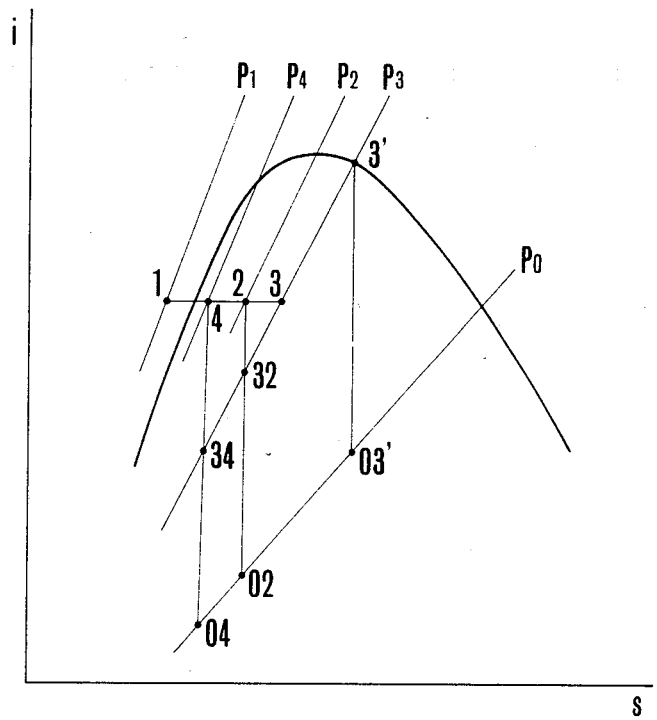
FIG. 7 shows the relations among the pressures of the reservoir, well outlet and separator with the use of a graph showing the relationship between i and s.

The operation of this invention will be described with reference to the i-s characteristics shown in FIG. 7, in which $P_1$ = Pressure in the reservoir
$P_2$ = Pressure at the well outlet
$P_3$ = Pressure in the separator
$P_4$ = Pressure at the well outlet under pumping effect by this invention
$P_0$ = Condensing pressure When the geothermal fluid is produced by the conventional production method, the condition of the fluid is changed as follows. The fluid expands under iso-enthalpic change from condition 1 at the reservoir to condition 2 at the well exit going up the well.

In the case of conventional single flash geothermal generating system, at the well exit valve, the fluid expands under iso-enthalpic change from condition 2 to condition 3 by flashing. The fluid in which steam and liquid are mixed is separated by the separator. The separated steam—condition 3'—expands to the pressure $0_3'$ in the steam turbine. In this case, available energy is shown as x $(i_3' - i_{03'})$ wherein x is a dryness factor.

When applying the total flow turbine, fluid is brought to the turbine without flushing and expands from condition 2 to condition 02. In this case, available energy is shown as $(i_2 - i_{02})$.

In the case of this invention, the expansion in the well is surpressed and fluid condition at the well exit goes to the left as shown as point 4 by the pumping effect. In this case, available energy is shown as $(i_4 - i_{04})$.

Figure 8:
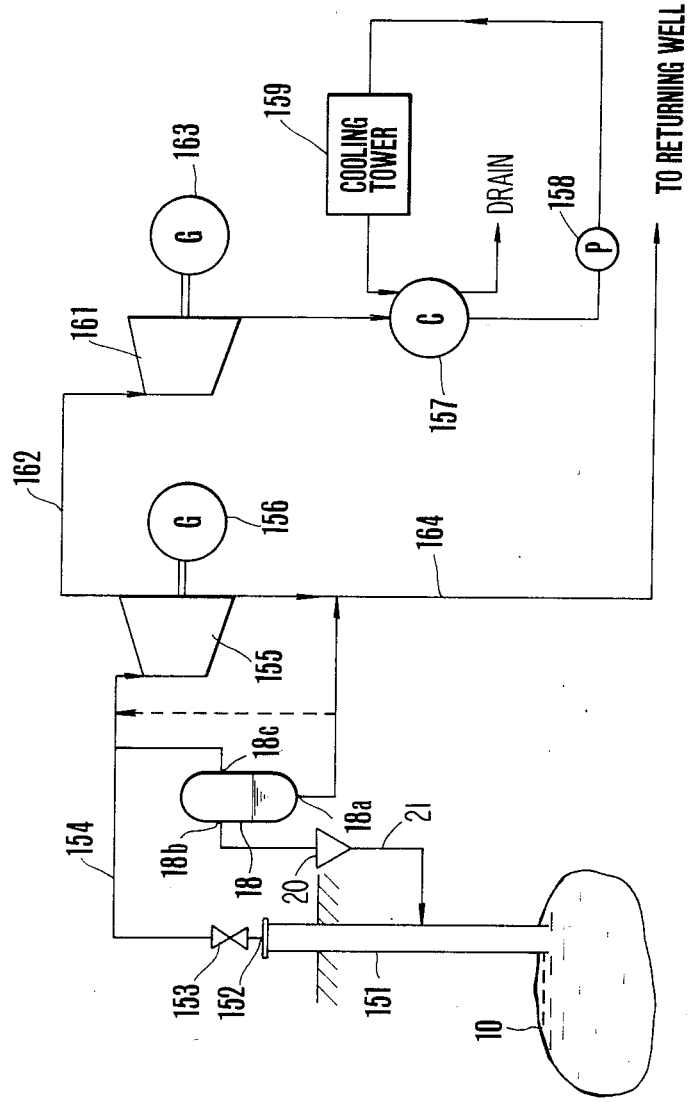
FIG. 8 is a diagrammatic representation of a modified geothermal electric power generating plant utilizing this invention.

A modified embodiment of this invention shown in FIG. 8 is different from the embodiment shown in FIG. 6 in the following point. More particularly, a steam turbine 161 is connected to receive steam from the total flow turbine 55 for driving an electric generator 163. The steam exhausted from the turbine 161 is condensed in a condenser 157 in the same manner as above described. The hot water separated by the total flow turbine 155 is returned to the substratum through a pipe 164 and a returning well (not shown) similar to that shown in FIG. 3. In this case, explanation is with reference to i-s diagram in FIG. 7. Geothermal fluid is brought to the total flow turbine at the condition 4 and expand to the medium pressure $P_3$ and fluid is separated to steam and fluid. The separated steam is brought to the steam turbine and expands from condition 3' to condition 03'. The available energy is shown as $(i_4 - i_{34}) + x(i_{3'} - i_{03'})$.

As above described, according to this invention, higher temperature geothermal fluid produced by a production well is supplied to a total flow turbine to effectively drive an electric generator.

What is claimed is:

1. A method of utilizing geothermal fluid comprising the steps of:
    producing geothermal fluid drawn from an underground substratum through a production well;
    separating steam from said geothermal fluid drawn from said underground substratum through said production well;
    compressing said separated steam to a pressure higher than that of said geothermal fluid;
    blowing said compressed steam into said production well so as to increase the pressure and temperature of said geothermal fluid in said production well and to increase a quantity of said geothermal fluid produced; and
    supplying said geothermal fluid drawn from said underground substratum through said production well directly to a fluid utilizing device;
    wherein said fluid utilizing device is a total flow turbine for driving an electric generator.

2. Apparatus for utilizing geothermal fluid comprising:
    a production well driven into an underground substratum containing said geothermal fluid;
    a water-steam separator connected to an exit port of said production well;
    a compressor for compressing steam separated by said water-steam separator; and
    means for supplying said compressed team into said production well; and
    means for supplying said geothermal fluid drawn from said exit port of said production well directly into a fluid utilizing device;
    wherein said fluid utilizing device comprises:
    a total flow turbine supplied with said geothermal fluid produced by said production well; and
    an electric generator driven by said total flow turbine.

3. A method of utilizing geothermal fluid comprising the steps of:
    producing geothermal fluid drawn from an underground substratum through a production well;
    separating steam from said geothermal fluid drawn from said underground substratum through said production well;
    compressing said separating team to a pressure higher than that of said geothermal fluid;
    blowing said compressed steam into said production well so as to increase the pressure and temperature of said geothermal fluid in said production well and to increase a quantity of said geothermal fluid produced; and
    supplying said geothermal fluid drawn from said underground substratum through said production well directly to a fluid utilizing device;
    wherein said fluid utilizing device is a heat exchanger and evaporator for utilizing organic Rankine cycle generation.

4. Apparatus for utilizing geothermal fluid comprising:
    a production well driven into an underground substratum containing said geothermal fluid;
    a water-steam separator connected to an exit port of said production well;
    a compressor for compressing steam separated by said water-steam separator;
    means for supplying said compressed steam into said production well; and
    means for supplying said geothermal fluid drawn from said exit port of said production well directly into a fluid utilizing device;
    wherein said fluid utilizing device comprises a heat exchanger and evaporator for utilizing organic Rankine cycle generation.

* * * * *